(12) United States Patent
Zheng

(10) Patent No.: US 7,689,309 B2
(45) Date of Patent: Mar. 30, 2010

(54) METHOD FOR GENERATING AN ELECTRO-HYDRAULIC MODEL FOR CONTROL DESIGN

(75) Inventor: Quan Zheng, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 201 days.

(21) Appl. No.: 11/773,204

(22) Filed: Jul. 3, 2007

(65) Prior Publication Data
US 2009/0012772 A1 Jan. 8, 2009

(51) Int. Cl.
*G06F 19/00* (2006.01)
*G06G 7/50* (2006.01)

(52) U.S. Cl. .......................... 700/97; 703/9
(58) Field of Classification Search ............ 700/28–31, 700/97, 103, 104, 275, 286, 287; 703/2, 703/6–9, 18
See application file for complete search history.

(56) References Cited

U.S. PATENT DOCUMENTS

| | | | |
|---|---|---|---|
| 5,172,312 A * | 12/1992 | Iino et al. ............... | 700/29 |
| 5,268,625 A * | 12/1993 | Plummer ................. | 318/610 |
| 5,586,033 A * | 12/1996 | Hall ........................ | 701/50 |
| 6,565,064 B2 | 5/2003 | Smith et al. | |
| 7,200,543 B2 * | 4/2007 | Palladino ................ | 703/14 |
| 7,219,040 B2 | 5/2007 | Renou et al. | |
| 7,257,522 B2 * | 8/2007 | Hagiwara et al. ....... | 703/8 |
| 7,437,014 B2 * | 10/2008 | Kim ......................... | 382/264 |
| 2004/0068338 A1 * | 4/2004 | Macy et al. ............. | 700/98 |
| 2006/0212343 A1 * | 9/2006 | Ferryanto et al. ....... | 705/11 |

OTHER PUBLICATIONS

MathWorks Products for Control Design Info Sheet, "The MATLAB and Simulink product families provide a complete set of tools for applying Model-Based Design to control system development," Copyright 2005 by The MathWorks, Inc.
"Single Modeling Environment for Constructing High-Fidelity Plant and Controller Models," Jim Ledin, Mike Dickens, and Jay Sharp, Copyright 2003 by The American Institute of Aeronautics and Astronautics, Inc.
SAE Technical Paper Series, 2000-01-1149, "Transmission Clutch Pressure Control System: Modeling, Controller Development and Implementation," Quan Zheng and Krishnaswamy Srinivasan, Reprinted from: Transmission and Driveline Symposium 2000 (SP-1522), SAE 2000 World Congress, Detroit, MI, Mar. 6-9, 2000.
SAE Technical Paper Series, 2001-01-0595, "A Model-Based Brake Presure Estimation Strategy for Traction Control System," Qingyuan Li, Keith W. Beyer and Quan Zheng, Reprinted from: Brake Technology, ABS/TCS, and Controlled Suspensions (SP-1576), SAE 2001 World Congress, Detroit, MI, Mar. 5-8, 2001.

(Continued)

*Primary Examiner*—M. N. Von Buhr
(74) *Attorney, Agent, or Firm*—Thomas N. Twomey

(57) ABSTRACT

The dynamic response characteristics of an electro-hydraulic (EH) physical plant is represented by a model. The model includes a series of second order transfer functions, one for each operating point, of the EH physical plant. Command pressure, overshoot, rise time, damping coefficient, natural frequency and gain parameters are determined in developing each transfer function. The model can be used to advance the time in which the design and development of a control system for the EH physical plant can begin.

10 Claims, 3 Drawing Sheets

OTHER PUBLICATIONS

SAE Technical Paper Series, 2002-01-0516, "Rapid Prototyping of ACC Algorithms with Virtual Human and Plan Models," Mingyu Wang, Lin-Jie Huang and Charles A. Archibald, Reprinted from: Progress in Climate Control Technologies (SP-1679), SAE 2002 World Congress, Detroit, MI, Mar. 4-7, 2002.

* cited by examiner

METHOD FOR GENERATING AN ELECTRO-HYDRAULIC MODEL FOR CONTROL DESIGN

TECHNICAL FIELD

The present invention relates generally to improvements in control system design, and more particularly, to a method for generating an electro-hydraulic model for control system design.

BACKGROUND OF THE INVENTION

Electro-hydraulic systems are used in a variety of industrial and other applications, including the automotive industry. Electro-hydraulic systems may be defined as those involving electrical signals (e.g., an electrical input command signal) and components (e.g., solenoids) that also further involve controlled hydraulic fluid paths and/or pressures. One example may be a two-stage main pressure regulating assembly that may be used in an automatic speed change transmission, where the first stage is a pressure control solenoid (PCS) providing a pilot pressure in response to an input command (i.e., electrical signal) and where the second stage includes a spool valve configured to regulate a main fluid pressure in accordance with the pilot pressure. This is only one example and those of ordinary skill in the art will recognize a wide range of other examples of electro-hydraulic systems.

In order to design a control system for operating such an electro-hydraulic physical plant, a plant dynamics model is conventionally required. However, acquiring an accurate plant dynamics model is a very time consuming and resource intensive undertaking. In certain instances, such an undertaking is simply not possible given the real-world product development timing requirements. Conventional approaches for obtaining an accurate plant dynamics model require making a prototype of the physical part or plant. This requirement can effectively serialize the control system development process, viz. first, the physical part or plant must be made and its input/output dynamics characterized, and then second, only when accurate plant dynamics are known, can the control system design begin. This leads to slower development times.

It is known in some fields of technology to begin preliminary control algorithm development work, using computer simulations, prior to actually producing a prototype and characterizing the same, as seen by reference to Wang et al., *Rapid Prototyping of ACC Algorithms with Virtual Human and Plant Models*, SAE 2002 World Congress, SAE 2002-01-0516 ("Rapid Prototyping"). The Rapid Prototyping article discloses an approach for developing controls for an automotive automatic climate control (ACC) system without subjecting the vehicle to environmental tunnel testing for proper calibration of the control algorithms. While use of the approach in the Rapid Prototyping article can greatly expedite development, its reach is admittedly to only preliminary control algorithm work, and in any event does not provide any direct guidance as to applicability to electro-hydraulic systems. Moreover, electro-hydraulic systems typically include a multitude of non-linearities (e.g., variance in gain), making characterization anything but straightforward.

There is therefore a need for a method for generating a model of an electro-hydraulic system that minimizes or eliminates one or more of the problems set forth above.

SUMMARY OF THE INVENTION

One advantage of the present invention is that it provides for a reduced time product development cycle, owing to parallelizing the two heretofore serially performed phases of: developing an accurate plant dynamics model and designing suitable control algorithms for operation of the electro-hydraulic plant. Thus, control system design can begin even before a physical part or plant is available. Another advantage of the present invention, in a further embodiment, is that it allows one to correlate the control system parameters with the criteria for the components of the electro-hydraulic system, which can in turn be used to provide guidance on how the physical design of the electro-hydraulic system affects the overall system dynamic behavior.

A method of designing a control system for an electro-hydraulic (EH) physical plant includes a number of steps. The electro-hydraulic physical plant is of the type configured to have a hydraulic fluid pressure output that varies in response to an electrical excitation signal input. The first step of the method involves generating a plant dynamics model of the electro-hydraulic physical plant over a plurality of operating points, using one of (i) test data or (ii) predetermined specification data. The next step involves establishing performance criteria for the control system. Finally, the last step involves generating parameters for the control system using the plant dynamics model of the electro-hydraulic physical plant and the predetermined performance criteria established for the control system.

In a preferred embodiment, the step of generating a plant dynamics model for the electro-hydraulic physical plant includes a number of substeps. The first substep involves determining, for each of the operating points, a respective command pressure using one of either (i) specification data and (ii) test data. The command pressure ($P\_{cmd}$) describes, for a particular operating point (e.g., at a certain supply pressure), the relationship between a desired output pressure (command pressure) and what command signal ($i\_{cmd}$) must be applied to the physical plant to obtain the commanded pressure. The next step involves determining, for each operating point, respective overshoot and rise time parameters in accordance with the corresponding command pressure. These parameters may be obtained via performance specification of the physical plant, or through testing. For example, at an operating point (i.e., a certain supply pressure), and for any particular command pressure ($P\_{cmd}$ of say 200 kPa), respective overshoot and rise time parameters may be determined. This can be repeated for other command pressures at the same operating point.

The next step involves determining, for each operating point, a respective damping coefficient parameter in accordance with the corresponding overshoot parameter determined above.

The next step involves determining, for each operating point, a respective natural frequency parameter in accordance with the corresponding rise time and damping coefficient parameters noted above.

The next step involves determining, for each operating point, a respective gain parameter in accordance with the corresponding command pressure and steady state actual output pressure. The electro-hydraulic plant may not be able to deliver the command pressure desired. Accordingly, the gain parameter is determined to account for such variance.

Finally, the method involves the step of generating, for each operating point, a respective transfer function in accordance with corresponding damping coefficient, natural frequency and gain parameters wherein the various transfer functions collectively characterize and define the plant dynamics model of the electro-hydraulic physical plant. In effect, a family of transfer functions, for different operating points, are generated and define the model. As noted above, the model will allow early, advance work to begin on the design of the control system.

Other features and aspects of the invention are also presented.

BRIEF DESCRIPTION OF THE DRAWINGS

The present invention will now be described by way of example, with reference to the accompanying drawings.

DETAILED DESCRIPTION OF THE PREFERRED EMBODIMENT

Figure 1:
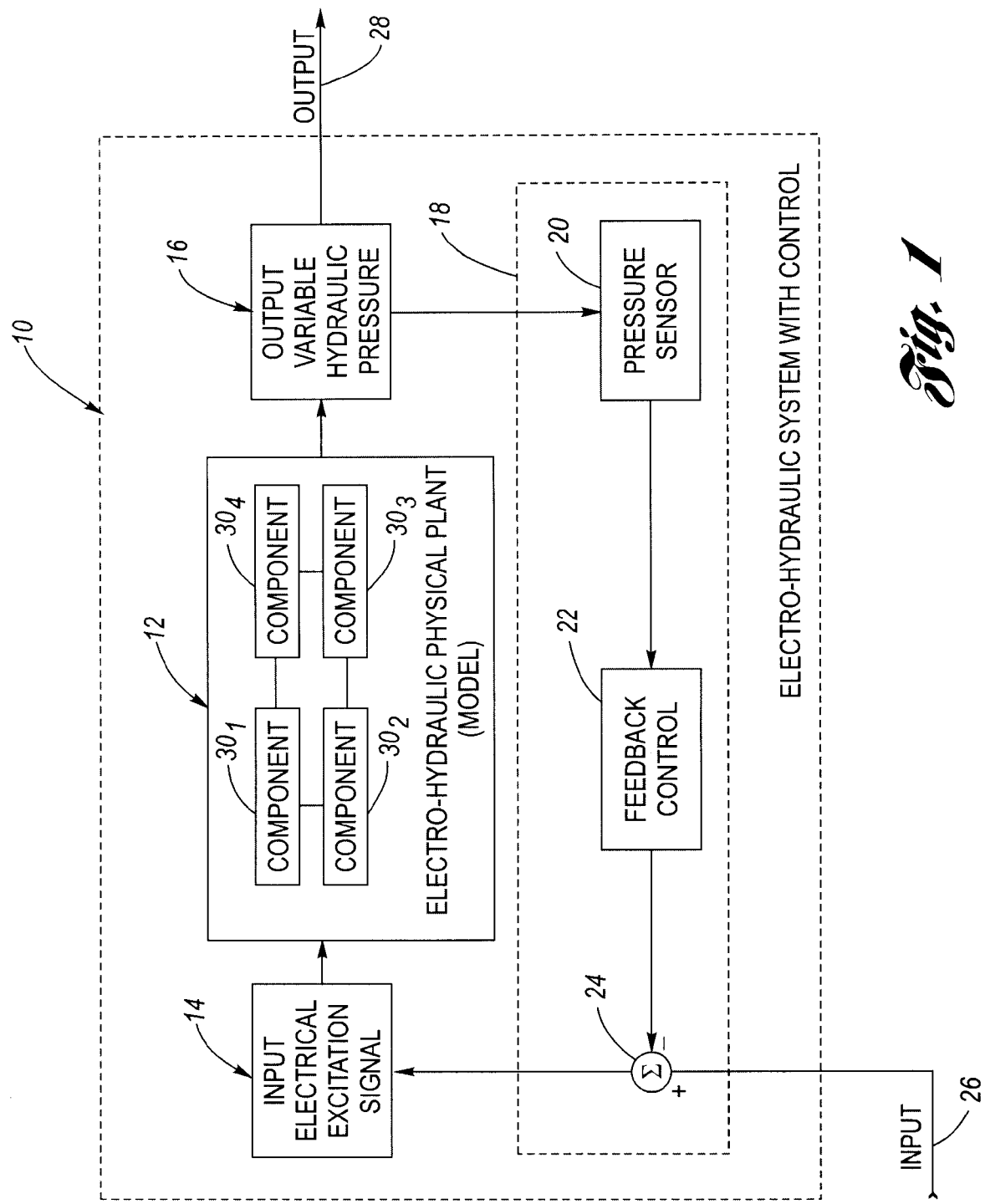
FIG. 1 is a block diagram showing a system of the present invention.

Referring now to the drawings wherein like reference numerals are used to identify identical components in the various views, FIG. 1 is a simplified block diagram of an electrically-controlled fluid pressure control system 10, which includes an electro-hydraulic (EH) physical plant 12. As described in the Background, in order to design a control system for an electro-hydraulic physical plant, an accurate model of the plant dynamics is conventionally required. However, developing an accurate model is a very time consuming and resource intensive process, and sometimes product development timelines do not allow for such accurate model development. Alternatively, product development timelines may be extended while awaiting development of the plant dynamics model. This conventional sequence essentially serializes the overall process, slowing development.

The present invention provides a systematic methodology to generate a model that accurately represents the dynamic response characteristics of an electro-hydraulic physical plant. Such a model may provide a base for early control system design work even before a physical part or plant is available. Alternatively, even if a prototype part or plant is available, the present invention nonetheless provides the methodology to advance in time the control design work before the final part or plant is available. Additionally, in either case, the present invention provides a mechanism to correlate overall control system parameters with the physical design criteria of components within the electro-hydraulic physical plant. This feature establishes a framework in which to provide guidance on how physical characteristics of such components (e.g., spring rate for a spring) may be varied to improve overall system performance.

FIG. 1 further shows that electro-hydraulic (EH) physical plant 12 has an electrical excitation signal 14 as an input and a variable hydraulic fluid pressure 16 as an output. Generally, the output pressure varies as a function of the input signal. Electro-hydraulic plant 12 may be defined as those physical plants involving electrical signals (e.g., an electrical input command signal) and components (e.g., solenoids) that also further involve controlled hydraulic fluid paths and/or pressures. One example may be a two-stage main pressure regulating assembly that may be used in an automatic speed change transmission, where the first stage is a pressure control solenoid (PCS) providing a pilot pressure in response to an input command (i.e., electrical signal) and where the second stage includes a spool valve configured to regulate a main fluid supply pressure in accordance with the pilot pressure. This is only one example and those of ordinary skill in the art will recognize a wide range of other examples of electro-hydraulic physical plants that fall within the spirit and scope of the present invention. Excitation signal 14 may be a current signal or voltage signal used as an input control signal, as known. Alternatively, excitation signal 14 may comprise a pulse width modulated (PWM) electrical signal, as also known in the art. Finally, while the arrangement shown in FIG. 1 may be generally described as showing what an ultimate application will look like, for design and development purposes, and in lieu of an actual part or plant, it will be appreciated that an electro-hydraulic (EH) plant dynamics model, corresponding to plant 12, may be used in system 10 for at least the purpose of designing the control system, as described below. This is indicated in FIG. 1 by the parenthetical designation "(MODEL)" within plant 12.

In this regard, FIG. 1 further shows that EH plant model 12 is coupled to a control system 18, which includes for illustration purposes only a fluid pressure sensor 20, a feedback control block 22, and a summer 24. As should be understood by those of ordinary skill in the art that various control approaches are known and may be selected and used in connection with an EH plant. An overall input command, designated 26, controls system 10 to produce an overall output fluid pressure 28. While the art is replete with references to various control approaches, control system 18 may be implemented by any conventional, known control approach, including without limitation a proportional-integral (PI) controller or a proportional-integral-derivative (PID) controller. Further, EH plant 12 includes a variety of constitute components (e.g., solenoids having orifices, springs, etc.), which are illustrated in block form as components designated $30_1$, $30_2$, $30_3$ and $30_4$.

Figure 2:
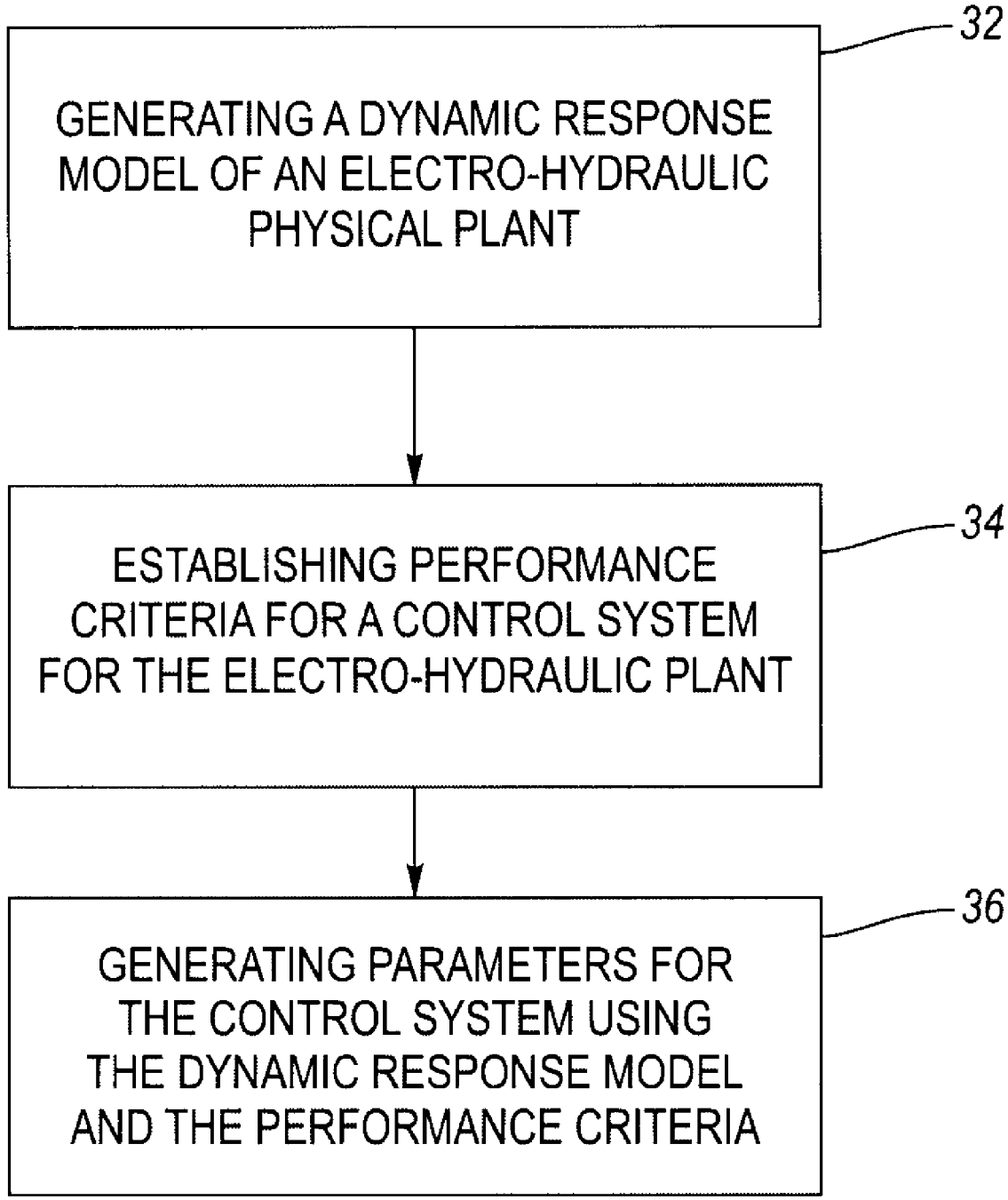
FIG. 2 is a simplified flow chart showing a method according to the invention.

FIG. 2 is a simplified flow chart showing a method of designing a control system using a plant dynamics model of an EH physical plant in accordance with the present invention. The method begins in step 32.

Step 32 of the method involves generating a model, reflecting the dynamics/response characteristics, of the electro-hydraulic physical plant over a plurality of operating points. The model is developed using one of either (i) predetermined specification data or (ii) test data. The dominant dynamics of most electro-hydraulic systems may be represented by a series of $2^{nd}$ order equations, which collectively define the model that characterizes the plant dynamics. A more detailed description of how step 32 is performed will be set forth below. The method proceeds to step 34.

Step 34 of the method involves establishing performance criteria for a control system for controlling the operation of the electro-hydraulic physical plant. This step is dependent on the particular control approach chosen, but nonetheless may be implemented by selecting values and/or value ranges for known performance parameters. The particulars may further depend on the actual application in which the system 10 is used. The method then proceeds to step 36.

Step 36 of the method involves generating parameters and/or parameter values using at least the model of the EH physical plant developed in step 32 in conjunction with the performance criteria for the overall system established in step 34. While step 36 may be performed manually, in one embodiment, step 36—designing the control system—may be implemented using computer-implemented control design software, such as, for example only, a commercially available produced referenced under the trade name MATLAB, by The MathWorks, Inc., Natick, Mass. USA. In such an embodiment, the commercial software may be configured to include the model for the EH physical plant developed in step 32.

Once the model is developed, control system design can be carried out using any control system design method, for example PID control, to achieve desired performance requirements such as rise time, overshoot and steady state error.

Figure 3:
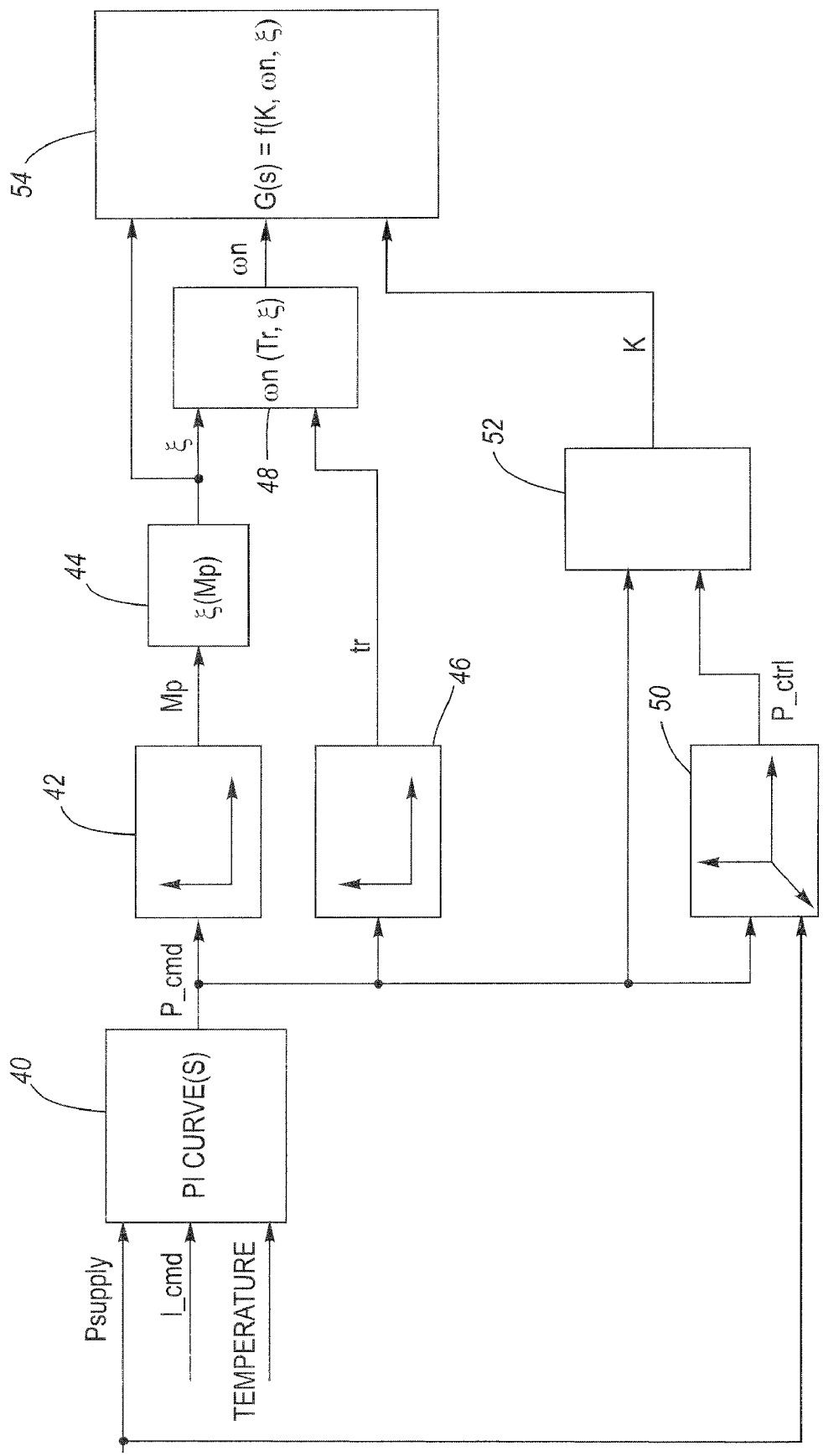
FIG. 3 is a functional block diagram showing the progression in processing to obtain a composite transfer function for a particular operating point of an electro-hydraulic plant.

FIG. 3 is a block diagram showing the methodology/progression used in developing an accurate model of an EH physical plant. As indicated above, the dominant dynamics of most electro-hydraulic systems may be represented fairly accurately by a series of $2^{nd}$ order equations, for various operating points, which collectively define the model and furthermore accurately reflect the plant dynamics. Specifically, equation (1) below defines a transfer function for the EH plant:

$$G(s) = \frac{K\omega_n^2}{s^2 + \xi\omega_n s + \omega_n^2} \tag{1}$$

Where the natural frequency $\omega_n$, damping coefficient $\xi$, and gain K all must be determined. One of the problems overcome by the invention relates to accuracy of the model. According to the invention, a series or plurality of transfer functions are established over a corresponding plurality of operating points of the EH physical plant being characterized. In this regard, as used herein, an operating point of an EH physical plant may be defined as including at least the hydraulic fluid supply pressure, and may further include temperature. Additionally, the input excitation signal (e.g., i_cmd), may also be considered to vary the operating point (as per a desired command pressure), although in the context of the invention, this variation is incorporated into the transfer function G(s).

Based on either technical specifications of the EH physical plant or actual test data of early prototypes or the like of the EH physical plant, parameters noted above, namely, the natural frequency $\omega_n$, damping coefficient $\xi$, and gain K can be derived by the following methodology.

The first step, designated by reference numeral 40 in FIG. 3, involves determining, for each operating point, a respective command pressure (P_cmd). The command pressure defines the relationship between a desired, commanded output pressure and the corresponding excitation signal input. For example, a command pressure of say Pa may require a command current (i_cmd) of mA. For the embodiment where test data is used, P-I (pressure-current) curves are typically taken using the EH physical plant (e.g., an early prototype thereof) at several supply pressures ("P_supply" FIG. 3) and temperatures ("Temperature" in FIG. 3), over various current inputs ("i_cmd" in FIG. 3). These P-I curves reflect the output pressure of the EH plant versus the input current provided to the EH plant. For the embodiment where specification data is used, this specification data typically is provided in the form of a table or the like listing output pressure (expected) versus input current (e.g., mA). In either case, the resultant command pressure (P_cmd) characterizes what input current is needed for a specified, desired output pressure.

The next step, designated by reference numeral 42 in FIG. 3, involves determining, for each operating point, a respective overshoot parameter ("M_p" in FIG. 3) in accordance with the command pressure (P_cmd). The overshoot parameter is generally stated as being a function of command pressure (P_cmd). The overshoot parameter is conventionally expressed as a percentage and may be as set forth in equation (2) below:

$$M_P(\%) = \frac{Value_{max-output} - Value_{cmd}}{Value_{cmd}} \tag{2}$$

where $Value_{max-output}$ is the maximum observed output value and $Value_{cmd}$ is the commanded output value, typically a step function. For example, if the command pressure called for an output pressure of 100 kPa, and the maximum observed output pressure was 120 kPa, then the overshoot parameter would be $M_p$=120/100=20%. The overshoot parameter may be observed or derived from test data or from specification data.

The next step, designated by reference numeral 44 in FIG. 3, involves determining, again for each operating point, a respective damping coefficient parameter ("$\xi$" in FIG. 3) in accordance with the corresponding overshoot parameter ($M_p$). Thus, once the overshoot parameter has been determined, the damping coefficient parameter $\xi$ may be determined in accordance with equation (3) below:

$$\xi = \frac{-\ln M_P}{\pi} \sqrt{\frac{1}{1 + \left(\frac{\ln M_P}{\pi}\right)^2}} \tag{3}$$

The next step, designated by reference numeral 46 in FIG. 3, involves determining, for each operating point, a respective rise time parameter ($t_r$) in accordance with the corresponding command pressure (P_cmd). The rise time parameter ($t_r$) is the time required for the output pressure to change, based on an input step, from a specified lower value, typically expressed as a percentage of the command pressure, to a specified upper value, also typically expressed as a percentage of the command. For an under-damped, second order system, the lower specified value is typically 0% and the upper specified value is 100%. For an over-damped system, the lower specified value is typically 10% and the upper specified value is 90%. The rise time parameter may be observed or derived from test data or from specification data.

The next step, designated by reference numeral 48 in FIG. 3, involves determining, for each operating point, a respective natural frequency parameter ("$\omega_n$" in FIG. 3) in accordance with the corresponding rise time ($t_r$) and damping coefficient ($\xi$) parameters. The damped natural frequency, $\omega_d$, is governed by equation (4) below.

$$\omega_d = \omega_n \sqrt{1-\xi^2} \tag{4}$$

The damped natural frequency, $\omega_d$, is that which may be observed experimentally.

The un-damped natural frequency parameter, $\omega_n$, is the frequency at which the system (i.e., electro-hydraulic physical plant) would oscillate if the damping factor, $\xi$, were decreased to zero. Accordingly, the un-damped natural frequency $\omega_n$ may be determined using equation (5) below:

$$\omega_n = \frac{1}{t_r \cdot \sqrt{1-\xi^2}} \tan^{-1}\left(\frac{\sqrt{1-\xi^2}}{-\xi}\right) \tag{5}$$

The next steps, designated by reference numerals 50, 52 in FIG. 3, involve determining, for each operating point, a respective system gain parameter ("K" in FIG. 3) in accordance with the corresponding command pressure and steady state output pressure data. System gain may be represented by equation (6) below:

$$K = \frac{P_{\_ctrl}}{P_{\_cmd}} \quad (6)$$

where $P_{\_ctrl}$ is the steady-state control pressure (i.e., the actual output pressure) and $P_{\_cmd}$ is input the command pressure. In step/block 50, the $P_{\_ctrl}$ is generated in accordance with the supply pressure (i.e., the operating point) and the command pressure. In step/block 52, equation (6) is evaluated to produce the system gain parameter K. It should be understood that the system gain K may be determined using test data or specification data.

The next step, designated by reference numeral 54 in FIG. 3, involves generating, for each operating point, a respective transfer function G(s) (see equation (1) above) in accordance with the corresponding damping coefficient, natural frequency and gain parameters. Collectively, the series or plurality of transfer functions characterize and define the plant dynamics model of the EH physical plant. As described above, this model may be subsequently used as a basis to begin designing the overall control system (e.g., control system 18 shown in FIG. 1).

Referring again to FIG. 1, plant 12 includes a variety of components $30_1$, $30_2$, $30_3$, and $30_4$. Another aspect of the invention relates to the capability of correlating high level control system performance parameters to design level component characteristics (e.g., spring rate of a spring). After the EH plant dynamics model has been developed, as described above, then each component $30_1$, $30_2$, $30_3$, $30_4$ is modeled. This may involve developing higher order transfer functions including in particular expressing the constitute contributions and/or of the particular structures in each component (e.g., springs, orifices, etc.). Such process is known generally in the art. After this is done, the EH model 12 is mapped onto the component level models. Through the mapping process, it can be discovered how changes in the design characteristics of certain components affect overall system performance. This tool provides guidance as to what changes in the design of the components are needed to obtain desired system performance.

A detailed higher order component level plant model can be analyzed to determine the dominant modes (dynamics) of the model. The higher order dynamics model can then be simplified to include lower order dynamics (dominate dynamics), such as the $2^{nd}$ order EH model described above. The model order reduction is a known art for those familiar with the field.

Through model order reduction, physical design parameters such as spring constant will be mapped to the $2^{nd}$ order EH model parameters. Therefore the effect of spring constant selection on system level performance can be established. Such establishment of the physical design parameter and system model parameter provides guidance on how design parameter should be tuned to achieve desired system level performance requirement.

While particular embodiments of the invention have been shown and described, numerous variations and alternate embodiments will occur to those skilled in the art. Accordingly, it is intended that the invention be limited only in terms of the appended claims.

The invention claimed is:

1. A method of designing a control system for an electro-hydraulic physical plant having a hydraulic fluid pressure output that varies in response to an excitation signal input, said method comprising the steps of:
   generating a plant dynamics model of the electro-hydraulic physical plant over a plurality of operating points using one of (i) predetermined specification data; and (ii) test data;
   establishing performance criteria for the control system; and
   generating operating parameters for the control system using the plant dynamics model and the predetermined performance criteria, wherein said step of generating the plant dynamics model includes the substeps of:
      determining, for each operating point, a respective command pressure, said command pressure defining a relationship between a desired, commanded output pressure and the corresponding excitation signal input;
      determining, for each operating point, respective overshoot and rise time parameters in accordance with the corresponding command pressure;
      determining, for each operating point, a respective damping coefficient parameter in accordance with the corresponding overshoot parameter;
      determining, for each operating point, a respective natural frequency parameter in accordance with the corresponding rise time and damping coefficient parameters;
      determining, for each operating point, a respective gain parameter in accordance with the corresponding command pressure and steady state output pressure data; and
      generating, for each operating point, a respective transfer function in accordance with the corresponding damping coefficient, natural frequency and gain parameters wherein the plurality of transfer functions collectively characterize and define the plant dynamics model of the electro-hydraulic physical plant.

2. The method of claim 1 wherein each operating point includes at least a respective hydraulic fluid supply pressure.

3. The method of claim 2 wherein each operating point further includes a temperature.

4. The method of claim 2 wherein the excitation signal comprises one of a current signal and a pulse width modulated (PWM) signal.

5. The method of claim 2 wherein said step of determining the command pressure comprises the substeps of
   obtaining a plurality of pressure-current curves for the electro-hydraulic physical plant taken at a corresponding plurality of operating points wherein each curve describes an output pressure of the electro-hydraulic physical plant in response to a current signal; and
   characterizing the pressure-current curves.

6. The method of claim 5 wherein said step of obtaining pressure-current curves is performed by the substep of
   evaluating test data on a sample electro-hydraulic physical plant.

7. The method of claim 5 wherein said step of obtaining pressure-current curves is performed by the substep of:
   evaluating specification data for the electro-hydraulic physical plant.

8. The method of claim 1 wherein said step of determining the damping coefficient includes the substep of:
   calculating a damping coefficient parameter in accordance with the following relationship:

$$\xi = \frac{-\ln M_P}{\pi} \sqrt{\frac{1}{1+\left(\frac{\ln M_P}{\pi}\right)^2}};$$

wherein MP is the overshoot parameter at a desired command pressure and is the resulting damping coefficient at such desired command pressure.

9. The method of claim 8 wherein said step of determining a natural frequency parameter includes the substep of:
calculating a natural frequency parameter in accordance with the following relationship:

$$\omega_n = \frac{1}{t_r \cdot \sqrt{1-\xi^2}} \tan^{-1}\left(\frac{\sqrt{1-\xi^2}}{-\xi}\right);$$

wherein is the damping coefficient at a desired command pressure, and is the resulting natural frequency at such desired command pressure.

10. The method of claim 1 wherein said step of determining a gain parameter includes the substep of:
calculating a gain parameter in accordance with the following relationship:

$$K = \frac{P_{\_ctrl}}{P_{\_cmd}};$$

wherein P_cmd is the desired command pressure, P_ctrl is the steady-state control pressure corresponding to an actual output pressure of the electro-hydraulic physical plant, and K is the resulting gain parameter at such desired command pressure.

\* \* \* \* \*